US009523877B2

(12) United States Patent
Lee et al.

(10) Patent No.: US 9,523,877 B2
(45) Date of Patent: Dec. 20, 2016

(54) LIQUID CRYSTAL DISPLAY AND MANUFACTURING METHOD THEREOF

(71) Applicant: SAMSUNG DISPLAY CO., LTD., Yongin, Gyeonggi-Do (KR)

(72) Inventors: Se Hyun Lee, Seoul (KR); Hyo Ju Jung, Incheon (KR); Ki Chul Shin, Seongnam-Si (KR); Ho Kil Oh, Yongin-Si (KR); Hak Sun Chang, Yongin-Si (KR)

(73) Assignee: SAMSUNG DISPLAY CO., LTD, Yongin, Gyeonggi-Do (KR)

( * ) Notice: Subject to any disclaimer, the term of this patent is extended or adjusted under 35 U.S.C. 154(b) by 0 days.

(21) Appl. No.: 14/337,423

(22) Filed: Jul. 22, 2014

(65) Prior Publication Data

US 2015/0185541 A1    Jul. 2, 2015

(30) Foreign Application Priority Data

Dec. 30, 2013 (KR) .................. 10-2013-0167558

(51) Int. Cl.
*G02F 1/1333* (2006.01)
*G02F 1/1362* (2006.01)

(52) U.S. Cl.
CPC ....... *G02F 1/133345* (2013.01); *G02F 1/1362* (2013.01); *G02F 1/133371* (2013.01); *G02F 2001/136222* (2013.01)

(58) Field of Classification Search
CPC ............... G02F 1/133345; G02F 1/133371; G02F 1/1362
See application file for complete search history.

(56) References Cited

U.S. PATENT DOCUMENTS

| 8,164,097 B2 | 4/2012 | Park et al. | |
| 2001/0004277 A1* | 6/2001 | Koma | G02F 1/1343 349/143 |
| 2004/0195704 A1* | 10/2004 | Nakata | H01L 23/544 257/797 |
| 2012/0105785 A1* | 5/2012 | Kim | G09G 3/3648 349/139 |

FOREIGN PATENT DOCUMENTS

| KR | 10-2001-0084456 | 9/2001 |
| KR | 10-2008-0025552 | 3/2008 |
| KR | 10-2009-0126765 | 12/2009 |

* cited by examiner

*Primary Examiner* — James Dudek
(74) *Attorney, Agent, or Firm* — F. Chau & Associates, LLC

(57) ABSTRACT

A liquid crystal display device includes: a first insulation substrate, a color filter disposed on the first insulation substrate and including a stepped region, a passivation layer disposed on the color filter and including an opening region overlapping with the stepped region, a pixel electrode disposed on the passivation layer including the opening region, a second insulation substrate facing the first insulation substrate, a common electrode disposed on the second insulation substrate and including a cross-shaped cutout, and a liquid crystal layer disposed between the first and second insulation substrates.

10 Claims, 14 Drawing Sheets

LIQUID CRYSTAL DISPLAY AND MANUFACTURING METHOD THEREOF

CROSS-REFERENCE TO RELATED APPLICATION

This application claims priority to Korean Patent Application No. 10-2013-0167558 filed on Dec. 30, 2013, the disclosure of which is hereby incorporated by reference herein in its entirety.

(a) TECHNICAL FIELD

The present disclosure relates to a liquid crystal display and a manufacturing method thereof.

(b) DISCUSSION OF THE RELATED ART

A liquid crystal display device is currently one of the most widely used flat panel display devices, and includes two display panels on which electric field generating electrodes such as a pixel electrode and a common electrode are formed, and a liquid crystal layer interposed between the two display panels.

The liquid crystal display device displays an image by generating an electric field on a liquid crystal layer by applying a voltage to the field generating electrodes, determining alignment directions of liquid crystal molecules of the liquid crystal layer through the generated field, and controlling polarization of incident light.

Among the liquid crystal display devices, a vertically aligned mode liquid crystal display device, in which liquid crystal molecules are aligned so that long axes thereof are perpendicular to a display panel while no electric field is applied, has been developed.

In the vertically aligned mode liquid crystal display device, it is significant to be able to secure a wide viewing angle, and a method of forming cutouts such as, for example, minute slits in the field generating electrode may be used to secure the wide viewing angle.

Cutouts and protrusions determine tilt directions of the liquid crystal molecules such that they may be appropriately disposed to create a plurality of domains in which the tilt directions of the liquid crystal molecules are different, thereby widening a viewing angle.

SUMMARY

Exemplary embodiments of the present invention have been made in an effort to provide a display device with reduced afterimages and a manufacturing method thereof without an additional process by removing and suppressing ionic impurities disposed between a passivation layer and a color filter.

A liquid crystal display device according to an exemplary embodiment of the present invention includes: a first insulation substrate, a color filter disposed on the first insulation substrate and including a stepped region, a passivation layer disposed on the color filter and including an opening region overlapping with the stepped region, a pixel electrode disposed on the passivation layer including the opening region, a second insulation substrate facing the first insulation substrate, a common electrode disposed on the second insulation substrate and including a cross-shaped cutout, and a liquid crystal layer disposed between the first and second insulation substrates.

The stepped region disposed in the opening region may have a greater height than a height of the color filter disposed in regions other than the stepped region.

The color filter and the pixel electrode may contact each other in the opening region.

The pixel electrode may overlap the pixel area and include a cross-shaped cutout, the pixel electrode may include a plurality of sub-regions based on edges of the pixel electrode and the cross-shaped cutout, and the pixel electrode may include cutouts disposed along the edges of the pixel electrode.

The opening region may have a flat plate shape on a plane.

The pixel electrode may have a same shape as a planar shape of the opening region.

A height of the opening region may be greater than about 700 Å.

The display device may further include a first thin film transistor and a second thin film transistor disposed on the first insulation substrate and connected to gate lines and data lines that are insulated from and cross each other, and a voltage-dividing thin film transistor connected to the gate lines, the second thin film transistor, and a reference voltage line.

The pixel electrode may include: a first pixel electrode connected to the first thin film transistor, and a second pixel electrode connected to the second thin film transistor and the voltage-dividing thin film transistor, and the first and second pixel electrodes may be disposed in a matrix form so as to form one pixel.

Liquid crystal molecules of the liquid crystal layer may be disposed to be nearly perpendicular to surfaces of the first and second substrates when no electric field is applied to the liquid crystal layer.

A manufacturing method of a liquid crystal display device according to an exemplary embodiment of the present invention may include: forming a color filter on a first insulation substrate, laminating a passivation layer on the color filter, forming an opening region by etching the passivation layer, forming a stepped region by etching the color filter overlapping with the opening region, forming a pixel electrode on the passivation layer including the opening region, and forming a common electrode on a second insulation substrate.

The stepped region disposed in the opening region may have a lower height than a height of the color filter disposed in regions other than the stepped region.

The etching of the passivation layer and the color filter and forming a contact hole exposing a drain electrode may be simultaneously performed.

One of a halftone mask, a mesh mask, and a slit mask may be used in etching the passivation layer and the color filter.

The common electrode may be formed to overlap with the pixel electrode and include a cross-shaped cutout, the pixel electrode may be formed to include a plurality of sub-regions based on edges of the pixel electrode and the cross-shaped cutout, and the pixel electrode may be formed to include cutouts formed along the edges of the pixel electrode.

The opening region may be formed to have a flat plate shape on a plane.

The pixel electrode may be formed to have a same shape as a planar shape of the opening region.

The opening region may be etched such that its height is greater than about 700 Å.

The manufacturing method may further include forming a first thin film transistor and a second thin film transistor on the first insulation substrate and connected to gate lines and data lines that are insulated from and cross each other, and forming a voltage-dividing thin film transistor connected to the gate lines, the second thin film transistor, and a reference voltage line.

The pixel electrode may include: a first pixel electrode connected to the first thin film transistor; and a second pixel electrode connected to the second thin film transistor and the voltage-dividing thin film transistor, and the first and second pixel electrodes may be disposed in a matrix form so as to form one pixel.

The forming of the passivation layer on the color filter may be performed by using a high-temperature chemical vapor deposition method.

According to the liquid crystal display device of exemplary embodiments of the present invention described above, a display device with reduced afterimages may be provided by using the high-temperature chemical vapor deposition method so as to remove or suppress the ionic impurities generated between the passivation layer and the color filter.

BRIEF DESCRIPTION OF THE DRAWINGS

Exemplary embodiments of the present invention can be understood in more detail from the following detailed description taken in conjunction with the attached drawings in which.

DETAILED DESCRIPTION OF EXEMPLARY EMBODIMENTS

Figure 1:
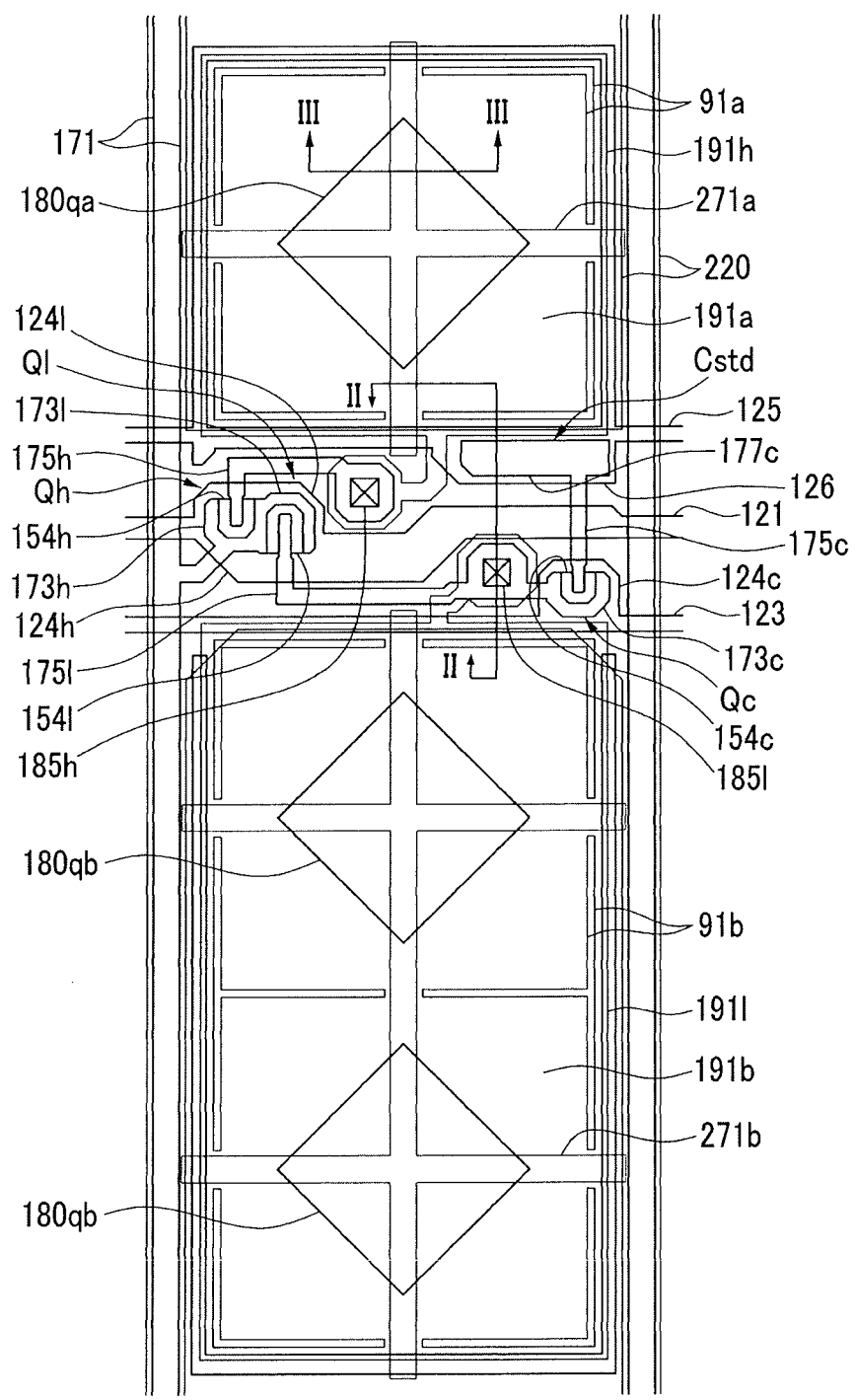
FIG. 1 is a layout view of a pixel of a liquid crystal display device according to an exemplary embodiment of the present invention.

Exemplary embodiments of present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc. may be exaggerated for clarity.

Like reference numerals designate like elements throughout the specification.

It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

A liquid crystal display device according to an exemplary embodiment of the present invention will now be described with reference to FIGS. 1 to 3.

Figure 2:
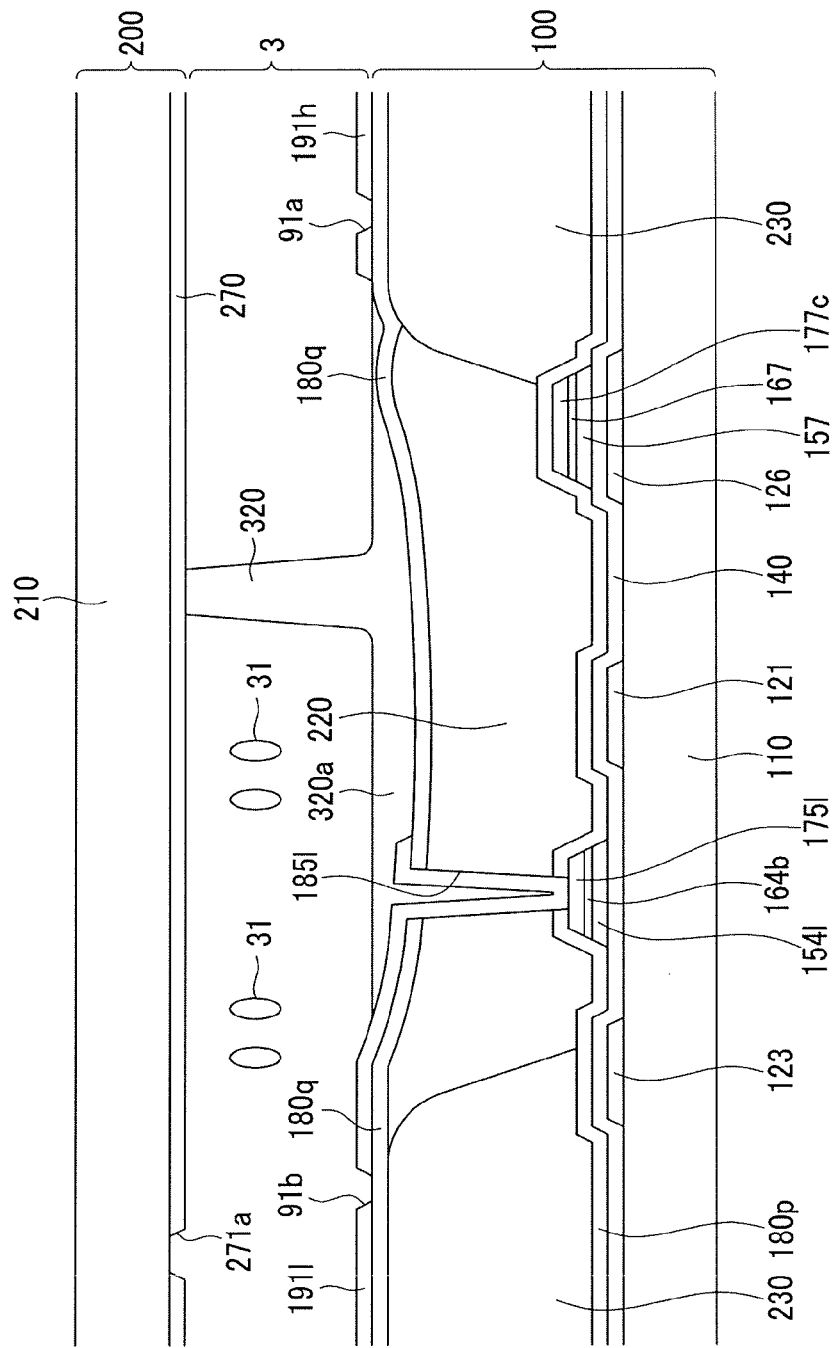
FIG. 2 is a cross-sectional view of the liquid crystal display device of FIG. 1 taken along the line II-II.
Figure 3:
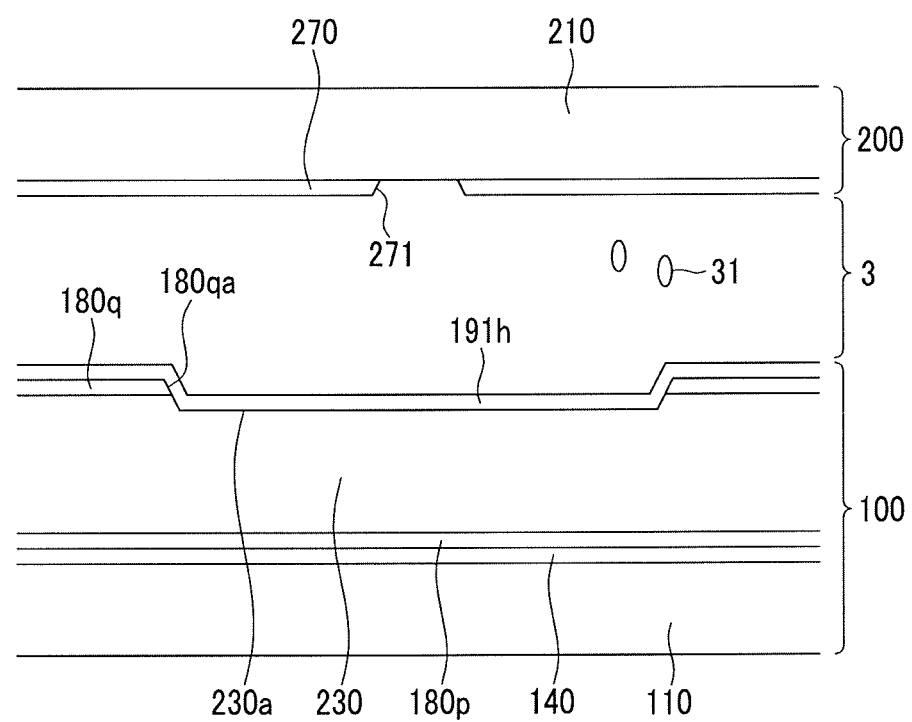
FIG. 3 is a cross-sectional view of the liquid crystal display device of FIG. 1 taken along the line III-III.

FIG. 1 is a layout view of a pixel of a liquid crystal display device according to an exemplary embodiment of the present invention, FIG. 2 is a cross-sectional view of the liquid crystal display device of FIG. 1 taken along the line II-II, and FIG. 3 is a cross-sectional view of the liquid crystal display device of FIG. 1 taken along the line III-III.

Referring to FIGS. 1 to 3, the liquid crystal display device according to the exemplary embodiment of the present invention includes a lower display panel 100 and an upper display panel 200 facing each other, a liquid crystal layer 3 interposed between these two panels 100 and 200, and a polarizer attached to an outer side of each of the display panels 100 and 200.

The lower display panel 100 will be described first.

A plurality of gate conductors including, for example, a gate line 121, a step-down gate line 123, and a storage electrode line 125 are formed on an insulation substrate 110. In an exemplary embodiment, the insulation substrate 110, may be made of, for example, transparent glass, quartz, or plastic. Further, in an exemplary embodiment, the insulation substrate 110 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The gate line 121 and the step-down gate line 123 mainly extend in, for example, a horizontal direction to transmit a gate signal.

The gate line 121 includes, for example, a first gate electrode 124h and a second gate electrode 124I protruding upward and downward, and the step-down gate line 123 includes, for example, a third gate electrode 124c protruding upward.

The first gate electrode 124h and the second gate electrode 124I are connected with each other to form one protrusion.

The storage electrode line 125 mainly extends in, for example, a horizontal direction to transfer a predetermined voltage such as a common voltage Vcom.

The storage electrode line 125 includes, for example, a storage electrode extending along edges of a first subpixel electrode 191h, and an extended capacitance electrode 126.

A gate insulating layer 140 is positioned on gate conductors 121, 123, and 125. For example, the gate insulating layer 140 may be made of silicon nitride (SiNx), silicon oxide (SiOx), silicon oxynitride (SiOxNy), aluminum oxide (AlOx), yttrium oxide ($Y_2O_3$), hafnium oxide (HfOx), zirconium oxide (ZrOx), aluminum nitride (AlN), aluminum oxynitride (AlNO), titanium oxide (TiOx), barium titanate (BaTiO3), lead titanate ($PbTiO_3$), or a combination thereof.

A plurality of semiconductors 151 that can be made of, for example, amorphous silicon or crystalline silicon are formed on the gate insulating layer 140.

The semiconductors 151 mainly extend in, for example, a vertical direction, and include first and second semiconductors 154h and 154l extending toward the first and second gate electrodes 124h and 124l and connected to each other, and a third semiconductor 154c connected to the second semiconductor 154l.

The third semiconductor 154c is extended to form a fourth semiconductor 157.

A plurality of ohmic contacts are formed on the semiconductors 151.

For example, a first ohmic contact is formed on the first semiconductor 154h, and a second ohmic contact 164b and a third ohmic contact are respectively formed on the second semiconductor 154l and the third semiconductor 154c.

The third ohmic contact is extended to form a fourth ohmic contact 167.

A data conductor including, for example, a plurality of data lines 171, a plurality of first drain electrodes 175h, a plurality of second drain electrodes 175l, and a plurality of third drain electrodes 175c is formed on the second ohmic contact 164b and the fourth ohmic contact 167.

The data line 171 for transmitting a data signal mainly extends in, for example, the vertical direction to cross the gate line 121 and the step down gate line 123.

Each data line 171 includes, for example, a first source electrode 173h and a second source electrode 173l extending toward the first gate electrode 124h and the second gate electrode 124l.

The first drain electrode 175h, the second drain electrode 175l, and the third drain electrode 175c include, for example, one wide end portion and one rod-shaped end portion.

The rod-shaped end portions of the first and second drain electrodes 175h and 175l are partially enclosed with the first and second source electrodes 173h and 173l.

One wide end portion of the second drain electrode 175l is extended to form a third source electrode 173c curved in, for example, a "U" shape.

A wide end portion 177c of the third drain electrode 175c overlaps the capacitance electrode 126 so as to form a step-down capacitor Cstd, and the bar-shaped end portion thereof is partially enclosed with the third source electrode 173c.

The first, second, and third gate electrodes 124h, 124l, and 124c, the first, second, and third source electrodes 173h, 173l, and 173c, and the first, second, and third drain electrodes 175h, 175l, and 175c form first, second, and third thin film transistors (TFT) Qh, Ql, and Qc together with the island-shaped semiconductors 154h, 154l, and 154c, respectively. A channel of the thin film transistor is formed in each of the semiconductors 154h, 154l, and 154c between each of the source electrodes 173h, 173l, and 173c and each of the drain electrodes 175h, 175l, and 175c.

The semiconductor 151 including the semiconductors 154h, 154l, and 154c has, for example, substantially the same planar shape as the data conductors 171, 175h, 175l, and 175c and the second ohmic contact 164b and the fourth ohmic contact 167 therebeneath except for the channel regions between the source electrodes 173h, 173l, and 173c and the drain electrodes 175h, 175l, and 175c.

That is, the semiconductor 151 including the semiconductors 154h, 154l, and 154c is provided with exposed portions, which are not covered by the data conductors 171, 175h, 175l, and 175c, between the source electrodes 173h, 173l, and 173c and the drain electrodes 175h, 175l, and 175c.

A lower passivation layer 180p made of, for example, an inorganic insulator such as silicon nitride or silicon oxide is formed on the data conductors 171, 175h, 175l, and 175c and the exposed portions of the semiconductors 154h, 154l, and 154c. Alternatively, in an embodiment, the lower passivation layer 180p may instead be made of, for example, an organic insulator such as benzocyclobutene (BCB), an acryl-based resin or a combination thereof.

A color filter 230 is positioned on the lower passivation layer 180p.

The color filter 230 is disposed in almost every region except for regions in which the first thin film transistor (Qh), the second thin film transistor (Ql), and the third thin film transistor (Qc) are positioned.

However, each color filter 230 may extend in, for example, a vertical direction along the neighboring data lines 171.

Each color filter 230 may display one of primary colors such as, for example, three primary colors of red, green, and blue.

A light blocking member 220 is formed on a region in which the color filter 230 is not positioned and a part of the color filter 230.

The light blocking member 220 is referred to as a black matrix, and prevents light leakage.

The light blocking member 220 extends, for example, along the gate line 121 and the step-down gate line 123 to expand upwardly and downwardly, and includes a first light blocking member 220a covering a region in which the first thin film transistor Qh, the second thin film transistor Ql, and the third thin film transistor Qc are disposed, and a second light blocking member 220b extending along the data line 171.

A height of a part of the light blocking member 220 may be, for example, smaller than the height of the color filter 230

The color filter 230 is provided with a stepped region 230a having different heights in one pixel.

The stepped region 230a is formed together with an opening 180qa of an upper passivation layer 180q, which will be described later, by etching such that it includes regions having different heights.

Thus, the stepped region 230a of the color filter 230 has the same planar shape as the shape of the opening region 180qa of the upper passivation layer 180q.

For example, the stepped region 230a is integrally formed when etching is performed to form the opening region 180qa such that it has a smaller height than the height of the other regions for the color filter 230 other than the stepped region.

Thus, the color filter 230 may include a stepped region 230a having a more or less smaller height, and the other regions having more or less greater heights than the stepped region 230a.

The upper passivation layer 180q including an inorganic insulator such as, for example, silicon nitride or silicon oxide is formed on the color filter 230 and the light blocking member 220. Alternatively, in an embodiment, the upper passivation layer 180q may instead be made of, for example, an organic insulator such as benzocyclobutene (BCB), an acryl-based resin or a combination thereof.

The upper passivation layer 180q prevents the color filter 230 and the light blocking member 220 from being lifted, and suppresses contamination of the liquid crystal layer 3 by an organic material such as a solvent flowing from the color filter 230 to prevent defects such as an afterimage which may be caused when an image is displayed.

The upper passivation layer 180q includes the opening region 180qa in which the upper passivation layer 180q is partially removed.

The opening region 180qa may be positioned at, for example, a center of the pixel electrode, such as, at a center of a cross-shaped cutout 271a of common electrode 270.

In this case, the opening region 180qa overlaps the stepped region 230a of the color filter 230.

This is because the stepped region 230a of the color filter 230 and the opening region 180qa of the upper passivation layer 180q are formed by the same etching process.

The opening region 180qa etched by the etching process as described above may be formed to have any shape, such as a rhombus or a quadrangle shape as an example. For example, a rhombus-shaped opening region 180qa is illustrated in FIG. 1

In this case, the height of the opening region 180qa may be greater than, for example, about 700 Å.

This is because of removal of interfacing surfaces of the laminated color filter 230 and passivation layers 180p and 180q may be conventionally required before performing the etching process.

The etching process for forming the stepped region 230a of the color filter 230 and the opening region 180qa of the upper passivation layer 180q may remove ionic impurities generated on the interfacing surfaces of the color filter 230 and the passivation layer 180 during a high-temperature deposition process.

Removal of the ionic impurities may result in reduced afterimages.

A plurality of first contact holes 185h and a plurality of second contact holes 185l respectively exposing the wide end portions of the first and second drain electrodes 175h and 175l are formed in the lower passivation layer 180p, the light blocking member 220, and the upper passivation layer 180q.

A plurality of pixel electrodes 191 are formed on the upper passivation layer 180q. The pixel electrodes 191 may be made of, for example, a transparent conductive material such as indium tin oxide (ITO), indium zinc oxide (IZO), aluminum zinc oxide (AZO), cadmium tin oxide (CTO), or a combination thereof.

The pixel electrode 191 may directly contact the upper passivation layer 180q in the regions other than the opening region 180qa, and may directly contact the color filter 230 in the opening region 180qa.

The pixel electrode 191 directly contacting the color filter 230 in the opening region 180qa may prevent the ionic impurities from being injected into the liquid crystal layer 3.

In summary, the pixel electrode 191 positioned in the opening region 180qa and directly contacting the color filter 230 may prevent the ionic impurities from coming out of the exposed stepped region 230a, thereby reducing the afterimages.

Referring to FIG. 2, the pixel electrodes 191 are separated from each other while interposing the gate line 121 and the step-down gate line 123 such that they are disposed above and below the pixel area based on the gate line 121 and the step-down gate line 123. The pixel electrodes 191 include a first subpixel electrode 191h and a second subpixel electrode 191l neighboring each other in a column direction.

The pixel electrode 191 is provided with a plurality of cutouts 91a and 91b formed along the edges thereof.

Among the plurality of cutouts 91a and 91b of the pixel electrode 191, the cutout 91a is formed along the edge of the first subpixel electrode 191h, while the cutout 91b is formed along the edge of the second subpixel electrode 191l.

By forming the cutouts 91a and 91b along the edges of the pixel electrode 191, the fringe field effect on the edges of the first and second subpixel electrodes 191h and 191l may be controlled to adjust a tilt direction of the liquid crystal molecules disposed in the edges of the first and second subpixel electrodes 191h and 191l.

That is, the pixel electrode 191 may include the cutouts 91a and 91b, and the other regions, that is, flat plate-shaped regions 191a and 191b.

In this case, the flat plate-shaped regions 191a and 191b may overlap the opening region 180qa and the stepped region 230a, and planer shapes of the flat plate-shaped regions 191a and 191b, the opening region 180qa, and the stepped region 230a may be identical.

The first and second subpixel electrodes 191h and 191l are applied with the data voltage from the first and second drain electrodes 175h and 175l through the first and second contact holes 185h and 185l, respectively.

The first and second subpixel electrodes 191h and 191l determine the direction of the liquid crystal molecules of the liquid crystal layer 3 between the two electrodes 191 and 270 by generating an electric field along with the common electrode 270 of the common electrode panel 200.

Luminance of light passing through the liquid crystal layer 3 may be varied according to the direction of the liquid crystal molecules described above.

The first subpixel electrode 191h and the common electrode 270 form a first liquid crystal capacitor together with the liquid crystal layer 3 interposed therebetween, and the second subpixel electrode 191l and the common electrode 270 form a second liquid crystal capacitor together with the liquid crystal layer 3 interposed therebetween, thereby maintaining the applied voltage even after the first and second thin film transistors Qh and Ql are turned off.

The first and second subpixel electrodes 191h and 191l overlap a storage electrode line 125 to form first and second storage capacitors, and the first and second storage capacitors enhance voltage sustaining performance of the first and second liquid crystal capacitors, respectively.

The capacitance electrode 126 and the wide end portion 177c of the third drain electrode 175c may overlap each other while interposing the gate insulating layer 140 and the semiconductor layer 157 therebetween so as to form the step-down capacitor Cstd.

Alternatively in an exemplary embodiment of the present invention, the semiconductor layer 157 disposed between the capacitance electrode 126 forming the step-down capacitor Cstd and the wide end portion 177c of the third drain electrode 175c may be removed.

A colored member 320 is formed on the upper passivation layer 180q.

The colored member 320 is disposed above the light blocking member 220.

The colored member 320 extends, for example, along the gate line 121 and the step-down gate line 123 to expand upwardly and downwardly, and includes a first light blocking member 220a covering the area in which the first, second, and third thin film transistors Qh, Ql, and Qc are positioned, a first colored member 320a disposed along a second light blocking member 220b extending along the data line 171, and a second colored member 320b.

The colored members 320a and 320b compensate a height difference between the light blocking member 220 and the color filter 230 so as to maintain a fixed cell gap between the liquid crystal layer disposed on the color filter 230 and the liquid crystal layer disposed on the light blocking member 220, thereby further alleviating light leakage of the light blocking member 220.

As describe above, as the step between the light blocking member 220 and the color filter 230 may disturb accurate control of the liquid crystal molecules disposed between the light blocking member 220 and the color filter 230, the colored members 320a and 320b may compensate the height difference between the light blocking member 220 and the color filter 230 so as to prevent light leakage generated on the edges of the pixel electrode 191.

In addition, as the cell gap on the light blocking member 220 is decreased, the average cell gap is decreased, such that the total amount of liquid crystal used in the liquid crystal display device may be decreased.

A lower alignment layer is formed on the pixel electrode 191, the exposed upper passivation layer 180q, and the colored members 320a and 320b.

The lower alignment layer may be, for example, a vertical alignment layer.

Next, the upper display panel 200 will be described.

The common electrode 270 is formed on an insulation substrate 210. In an exemplary embodiment, the insulation substrate 210, may be made of, for example, transparent glass, quartz, or plastic. Further, in an exemplary embodiment, the insulation substrate 210 may be, for example, a flexible substrate. Suitable materials for the flexible substrate include, for example, polyethersulfone (PES), polyethylenenaphthalate (PEN), polyethylene (PE), polyimide (PI), polyvinyl chloride (PVC), polyethylene terephthalate (PET), or combinations thereof.

The common electrode 270 is provided with, for example, a plurality of cutouts 271a and 271b. The common electrode 270 may be made of, for example, a transparent conductive material such as indium tin oxide (ITO), indium zinc oxide (IZO), aluminum zinc oxide (AZO), cadmium tin oxide (CTO), or a combination thereof.

The cutout 271a of the common electrode 270 is disposed at a position corresponding to the first subpixel electrode 191h, while the cutout 271b is disposed at a position corresponding to the second subpixel electrode 191l.

When viewed from a plane, the cutouts 271a and 271b may have, for example, a cross shape, and edges thereof may protrude further than edges of the first and second subpixel electrodes 191h and 191l.

As describe above, by forming the edges of the cutouts of the common electrode 270 to protrude above the edge of the pixel electrode, the fringe field stably affects the edge of the pixel area and thus the liquid crystal molecules may be controlled to be aligned in a desired direction even in the edges of the pixel area.

In addition, even if misalignment of the upper and lower display panels 100 and 200 occurs, the cutouts 271a and 271b of the common electrode 270 may overlap with the first and second subpixel electrodes 191h and 191l.

The width of the cutouts 271a and 271b should be less than the width of the liquid crystal layer 3, such as, for example, less than three times the cell gap.

The regions corresponding to the first and second subpixel electrodes 191h and 191l may be differentiated into a plurality of subregions by the edges of the cutouts 271a and 271b, the first subpixel electrode 191h, and the second subpixel electrode 191l.

An upper alignment layer is formed on the common electrode 270.

The upper alignment layer may be, for example, a vertical alignment layer.

Two polarizers are provided on outer sides of the two display panels 100 and 200, and it is beneficial that transmissive axes of the two polarizers are perpendicular to each other and one of them is in parallel with the gate line 121.

However, the polarizer may be positioned on the outer side of either of the two display panels 100 and 200.

The liquid crystal layer 3 interposed between the lower and upper display panels 100 and 200 contains liquid crystal molecules 31 having negative dielectric anisotropy.

At least one of the liquid crystal layer 3 and the lower and upper alignment layers may contain a photoreactive material.

For example, the photoreactive material may be a photopolymerizable material.

The liquid crystal molecules 31 of the liquid crystal layer 3 are aligned to be perpendicular to the surfaces of the two display panels 100 and 200 with respect to their long axes when no electric field is applied.

Thus, the incident light does not pass through the crossed polarizers but is blocked when there is no electric field.

The liquid crystal molecules 31 may be initially aligned to have pretilts such that, for example, the long axes thereof are disposed, by the cutouts 271a and 271b of the common electrode 270 and the subpixel electrodes 191h and 191l, in a parallel direction toward a central part of the cutouts 271a and 271b of the cross-shaped common electrode 270 from four portions in which the edges of the respective subpixel electrodes 191h and 191l extending in different directions meet.

Thus, each of the first and second subpixel electrodes 191h and 191l has four subregions having different pretilt directions of the liquid crystals.

The liquid crystal display device according to the present exemplary embodiment of the present invention has been described in a case in which the cross-shaped cutouts 271a and 271b are formed in the common electrode, but exemplary embodiments of the present invention are not limited thereto. For example, alternatively in an exemplary embodiment, a case in which the cross-shaped cutouts 271a and 271b are formed in at least one of the pixel electrode 191 as the field generating electrode and the common electrode 270 may be possible.

For example, the cross-shaped cutouts 271a and 271b may be formed in the pixel electrode 191, or in both the pixel electrode 191 and the common electrode 270.

As described above, the first and second subpixel electrodes 191h and 191l applied with the data voltage may generate the electric field along with the common electrode 270 of the common electrode display panel 200 such that the liquid crystal molecules 31 of the liquid crystal layer 3 aligned perpendicular to the surfaces of the two electrodes 191 and 270 when no electric field is present lie down towards a horizontal direction with respect to the surfaces of the pixel electrode 191 and the common electrode 270, thereby realizing varied luminance of light passing through the liquid crystal layer 3 according to a lying degree of the liquid crystal molecules.

The liquid crystal display according to the present exemplary embodiment of the present invention may remove the ionic impurities generated on the interfacing surface of the color filter 230 and the upper passivation layer 180q by forming the opening region 180qa and the stepped region 230a, such that the liquid crystal display device having reduced afterimages may be implemented by suppressing an outflow of the ionic impurities through the pixel electrode 191 positioned to overlap the opening region 180qa and the stepped region 230a.

Next, referring again to FIG. 1, a manufacturing method of a liquid crystal display device will now be described.

As described above, the first and second switching elements Qh and Ql are three-terminal elements such as, for example, a thin film transistor such that control terminals thereof are connected to the gate line 121, input terminals thereof are connected to the data line 171, an output terminal of the first switching element Qh is connected to the first subpixel electrodes 191h, and an output terminal of the second switching element Ql is connected to the second subpixel electrode 191l and an input terminal of the third switching element Qc.

The third switching element Qc is also a three-terminal element such as, for example, a thin film transistor such that a control terminal thereof is connected to the step-down gate line 123, the input terminal thereof is connected to the output terminal of the second switching element Ql that is connected to the second subpixel electrode 191l, and an output terminal thereof is connected to the step-down capacitor Cstd.

When a gate-on signal is applied to the gate line 121, the first and second switching elements Qh and Ql connected thereto are turned on.

Thus, the data voltage applied to the data line 171 is applied to the first and second subpixel electrodes 191h and 191l through the turned-on first and second switching elements Qh and Ql.

In this case, the data voltages applied to the first and second subpixel electrodes 191h and 191l are the same in their magnitudes.

Thus, the charged voltages for the first and second liquid crystal capacitors are the same.

Next, when a gate-off signal is applied to the gate line 121 and the step-down gate line 123 is applied with the gate-on signal, the first and second switching elements Qh and Ql are turned off and the third switching element Qc is turned on.

Then, charges move to the step-down capacitor Cstd from the second subpixel electrode 191l through the third switching element Qc.

Then, the charged voltage of the second liquid crystal capacitor is decreased, and the step-down capacitor Cstd is charged.

As the charged voltage of the second liquid crystal capacitor is decreased by capacitance of the step-down capacitor Cstd, the charged voltage of the second liquid crystal capacitor becomes lower than the charged voltage of the first liquid crystal capacitor.

In this case, the charged voltages of the two liquid crystal capacitors and represent different gamma curves, and a gamma curve of one pixel voltage becomes a curve acquired by combining the different gamma curves.

A combined gamma curve at the front coincides with a reference gamma curve at the front which is most appropriately determined, and a combined gamma curve at the side becomes closest to the reference gamma curve at the front.

As such, side visibility may be increased by converting image data.

In a display device according to an exemplary embodiment of the present invention, to differentiate the charged voltages of the first and second liquid crystal capacitors, includes the third switching element Qc connected to the output terminal of the second switching element Ql that is connected to the second subpixel electrode 191l for forming the second liquid crystal capacitor, and the step-down capacitor Cstd, but exemplary embodiments of the present invention are not limited thereto. For example, alternatively, a display device according to an exemplary embodiment of the present invention may include the third switching element, that is, the dividing-voltage thin film transistor Qc connected to the second liquid crystal capacitor and a dividing reference voltage line.

For example, the third switching element including the first terminal connected to the same gate line 121 as the first and second switching elements Qh and Ql, the second terminal connected to the second subpixel electrode 191l for forming the second liquid crystal capacitor, and the third terminal connected to the dividing-voltage capacitor overlapping the dividing reference voltage line is included, and the charged voltage of the second liquid crystal capacitor is partially divided such that the charged voltage of the liquid crystal capacitor can be lowered by a difference between the common voltage and the dividing reference voltage.

As such, the charged voltages of the first and second liquid crystal capacitor may be differently set.

In addition, in case of the liquid crystal display device according to the present exemplary embodiment of the present invention, the first and second liquid crystal capacitors are respectively connected to different data lines such that the charged voltages thereof can be differently set.

In addition to this, the charged voltages of the first and second liquid crystal capacitors may be differently set by using various methods.

The basic area of the field generating electrode of the liquid crystal display device according to the present exemplary embodiment of the present invention and its corresponding alignments of the liquid crystal molecules will now be described with reference to FIGS. 4 and 5.

Figure 4:
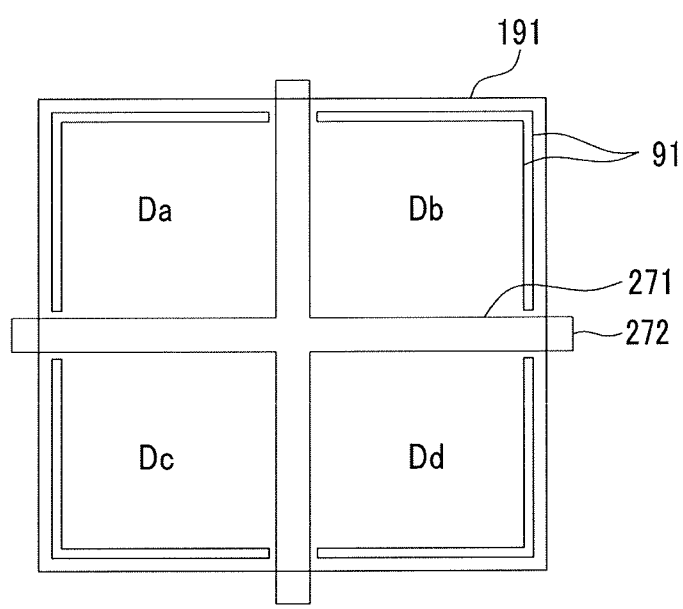
FIG. 4 is a top plan view of a basic region of a field generating electrode according to an exemplary embodiment of the present invention.
Figure 5:
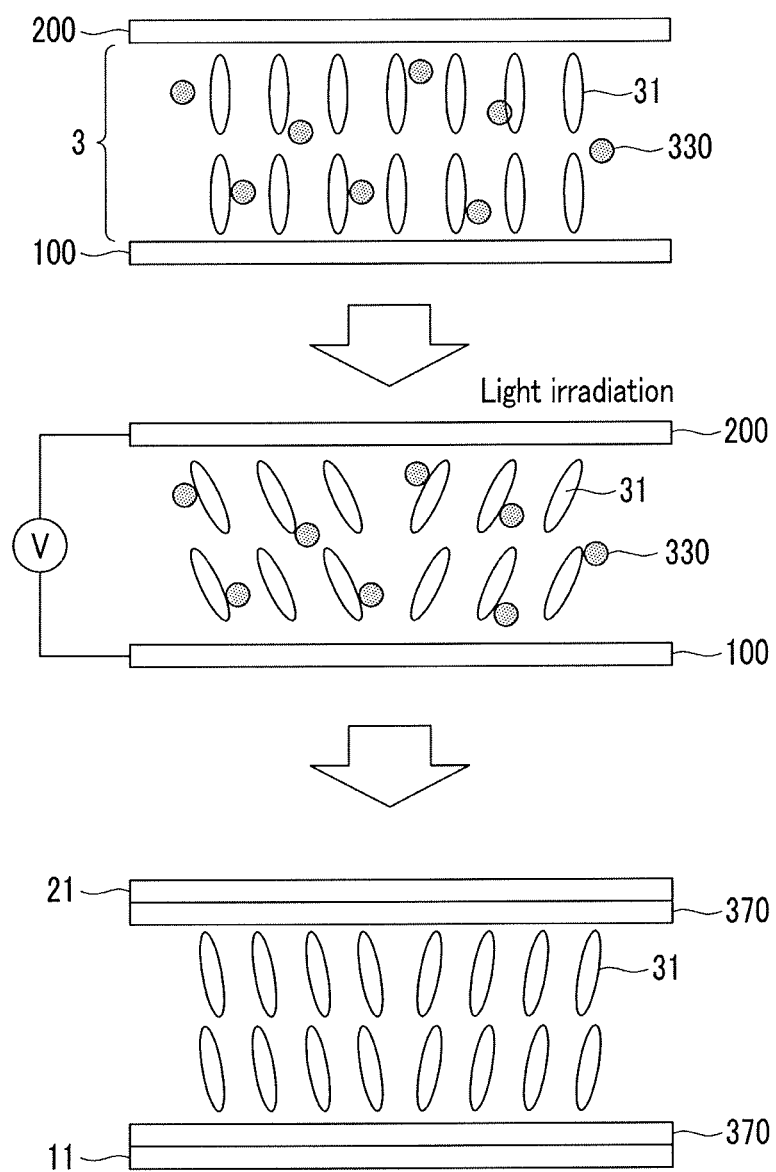
FIG. 5 is a drawing showing a process for providing a pretilt to liquid crystal molecules by using prepolymers that are polymerized by light such as ultraviolet rays.

FIG. 4 is a top plan view of a basic region of a field generating electrode according to an exemplary embodiment of the present invention, and FIG. 5 is a drawing showing a process for providing a pretilt to liquid crystal molecules by using prepolymers that are polymerized by light such as ultraviolet rays.

As shown in FIG. 4, the basic area of the field generating electrode includes, for example, the pixel electrode 191 facing a cutout 271 of the common electrode 270, and a cutout 91 of the pixel electrode 191 enclosing the cutout 271 of the common electrode 270.

When viewing the liquid crystal display from above, a basic region defined by the cutout 271 of the common electrode 270 and the edges of the pixel electrode 191 may be divided into, for example, a plurality of small regions Da, Db, Dc, and Dd, and the plurality of small regions Da, Db, Dc, and Dd may be symmetrical to each other based on the cutout 271 of the common electrode 270.

As describe above, the cutout 271 of the common electrode 270 may have, for example, a cross shape on a plane, and an edge 272 of the cutout 271 protrudes further than edges of the pixel electrode 191.

The cutout 271 of the common electrode 270 may have, for example, a width of about to about 2 to 4 μm.

The cutout 91 of the pixel electrode 191 is formed in, for example, a substantially quadrangular ring shape along the edge of the pixel electrode 191, and is disconnected in the vicinity of portions which correspond to ends of the cutout 271 of the common electrode 270.

As such, the portion in which the cutout 91 of the pixel electrode 191 is disconnected is used as a connection portion of the pixel electrode 191.

The connection portion of the pixel electrode 191 has, for example, a larger width than that of the cutout 271 of the common electrode 270.

The cutout 91 of the pixel electrode 191 may be disposed at a position spaced apart from the edge of the pixel electrode 191 by an interval of, for example, two times or less the cell gap of the liquid crystal display device, and the width of the cutout 91 should be, for example, two times or less the cell gap of the liquid crystal display device.

The cutout 91 of the pixel electrode 191 may control the influence of the fringe field on the edges of the pixel areas so as to adjust a tilt direction of the liquid crystal molecules disposed in the edges of the pixel electrode 191.

The width of the cross-shaped cutout 271 should be less than that of the liquid crystal layer 3, such as, for example, less than three times the cell gap.

Referring to FIG. 5, an initial aligning method for the liquid crystal molecules 31 to have pretilts will be described.

Prepolymers 330 such as monomers cured by polymerization by light such as, for example, ultraviolet light are injected between the two display panels 100 and 200 together with a liquid crystal material.

In this case, the prepolymers 330 may be included in the alignment layer formed between the two display panels 100 and 200 as well as the liquid crystal layer.

The prepolymers 330 may be, for example, reactive mesogens that are polymerized by the light such as ultraviolet light.

Next, data voltages are applied to the first and second subpixel electrodes 191h and 191l, and a common voltage is applied to the common electrode 270 of the upper display panel 200 to generate an electric field in the liquid crystal layer 3 between the two display panels 100 and 200.

Then, the liquid crystal molecules 31 of the liquid crystal layer 3 are tilted substantially in parallel with a direction facing the central portion of the cross-shaped cutout 271 of the common electrode 270 from four portions where edges of the pixel electrode 191 extending in different directions meet, by the fringe field due to the cutout 271 of the common electrode 270 and the edge of the pixel electrode 191, in response to the electric field. In addition, tilt directions of the liquid crystal molecules 31 in one basic area of the field generating electrode become a total of four.

That is, the tilt directions of the liquid crystal molecules 31 in the domains Da, Db, Dc, and Dd are respectively different from each other.

The liquid crystal display device according to the present exemplary embodiment of the present invention has been described as a case in which the cross-shaped cutout 271 is formed in the common electrode 270, but exemplary embodiments of the present invention are not limited thereto. For example, alternatively, in an exemplary embodiment, a case in which the cross-shaped cutout 271 is formed in at least one of the pixel electrode 191 as the field generating electrode and the common electrode 270 may be possible.

For example, the cross-shaped cutout 271 may be formed in the pixel electrode 191, or in both the pixel electrode 191 and the common electrode 270.

In addition, a configuration in which the pixel electrode 191 has, for example, a flat plate shape and the cutouts are disposed in edges thereof has been described in the present exemplary embodiment, but exemplary embodiments of the present invention are not limited thereto.

That is, the pixel electrode 191 according to exemplary embodiments of the present may have any shapes including the flat plate shape.

As described above, in the case of the liquid crystal display according to the present exemplary embodiment of the present invention, a plurality of subregions having different tilt directions of liquid crystals 31 may be formed while the pixel electrode 191 does not have a plurality of branched electrodes, such that a viewing angle of the liquid crystal display may be widened, response speed of the liquid crystal molecules 31 may be increased by aligning the liquid crystal molecules 31 so as to be arranged in a predetermined direction, and visibility, an open ratio, and transmittance may be increased by dividing the pixel electrode 191 into two electrodes and applying different voltages thereto.

And then, alignment layers 11 and 21 including alignment materials are formed on two display panels 100 and 200.

In addition, the liquid crystal display device according to the present exemplary embodiment of the present invention, by forming the opening region 180qa and the stepped region 230a disposed at positions corresponding to the flat plate area of the pixel electrode 191, may not only remove the ionic impurities generated on the interfacing surface of the color filter 230 and the upper passivation layer 180q, but also suppress the outflow of the ionic impurities, thereby reducing the afterimages.

A manufacturing process of a liquid crystal display according to an exemplary embodiment of the present invention will now be described with reference to FIGS. 6 to 10.

FIGS. 6 to 10 are cross-sectional views showing a manufacturing process for the liquid crystal display of FIGS. 1-3 according to an exemplary embodiment of the present invention.

FIGS. 6 to 10 have illustrated only cross-sectional views of a region in which a first thin film transistor and a pixel electrode are positioned, but such a manufacturing process may also be applied to other regions.

Figure 6:
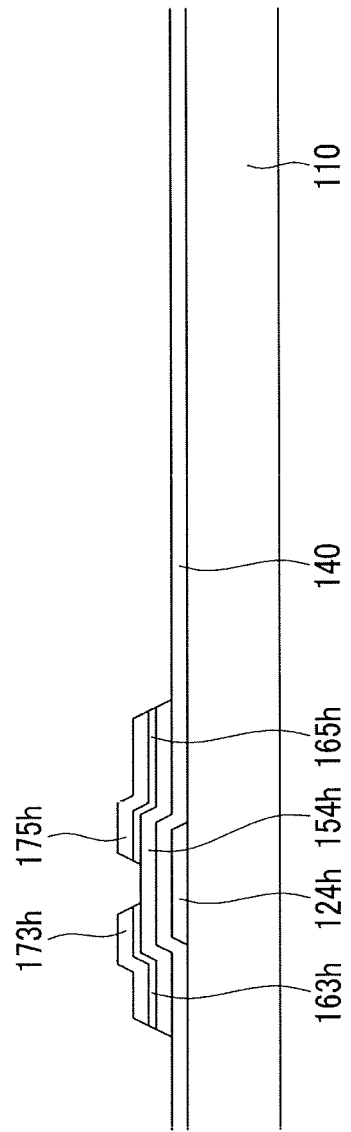
FIGS. 6 to 10 are cross-sectional views showing a manufacturing process for the liquid crystal display of FIGS. 1-3 according to an exemplary embodiment of the present invention.

Firstly, referring to FIG. 6, a gate conductor including a first gate electrode 124h is formed on a substrate 110.

A gate insulating layer 140 is formed on the gate conductor including the first gate electrode 124h.

A plurality of semiconductors 151 including, for example, a first semiconductor 154h that can be made of amorphous silicon or crystalline silicon is formed on the gate insulating layer 140.

For example, a plurality of ohmic contacts 163h and 165h are formed on the semiconductor 151, and a plurality of data lines 171 including a first source electrode 173h and a data conductor including a plurality of first drain electrodes 175h are formed on the ohmic contacts 163h and 165h.

The first, second, and third gate electrodes 124h, 124l, and 124c, the first, second, and third source electrodes 173h, 173l, and 173c, and the first, second, and third drain electrodes 175h, 175l, and 175c form first, second, and third thin film transistors (TFT) Qh, Ql, and Qc together with the island-shaped semiconductors 154h, 154l, and 154c, respectively. A channel of the thin film transistor is formed in each of the semiconductors 154h, 154l, and 154c between each of the source electrodes 173h, 173l, and 173c and each of the drain electrodes 175h, 175l, and 175c.

The semiconductor 151 including the semiconductors 154h, 154l, and 154c is formed to have, for example, substantially the same planar shape as the data conductors 171, 175h, 175l, and 175c and the ohmic contacts 163h and 165h therebeneath except for the channel regions between the source electrodes 173h, 173l, and 173c and the drain electrodes 175h, 175l, and 175c.

That is, the semiconductor 151 including the semiconductors 154h, 154l, and 154c are provided with exposed portions, which are not covered by the data conductors 171, 175h, 175l, and 175c, between the source electrodes 173h, 173l, and 173c and the drain electrodes 175h, 175l, and 175c.

Figure 7:
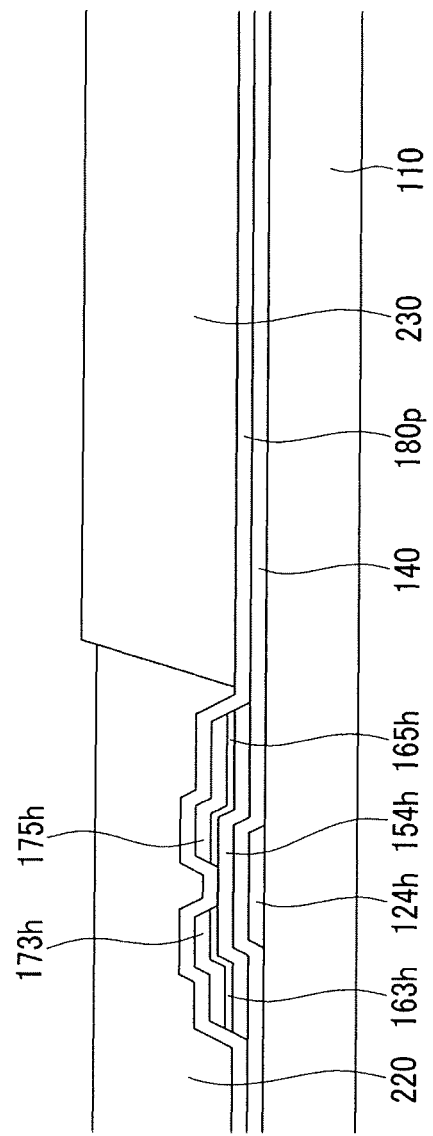

Next, referring to FIG. 7, a lower passivation layer 180*p* is formed on the data conductors 171, 175*h*, 175*l*, and 175*c* and the exposed portions of the semiconductors 154*h*, 154*l*, and 154*c*, and a light blocking member 220 and a color filter 230 are formed on the lower passivation layer 180*p*.

An upper passivation layer 180*q* is further laminated on the color filter 230.

In this case, the color filter 230 and the upper passivation layer 180*q* may be laminated by using, for example, a chemical vapor deposition method in a high temperature environment.

Figure 8:
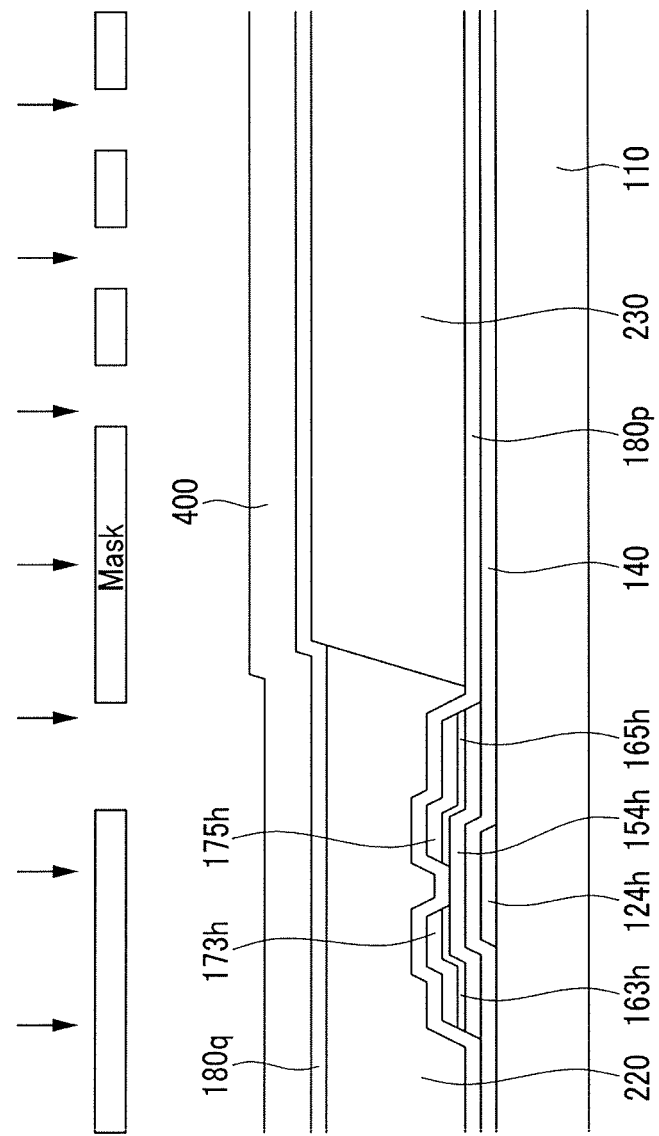

Next, similar to as shown in FIG. 8, a photosensitive film is spread, and then a photosensitive film pattern is developed by using, for example, a slit mask.

As an example in the present specification, the slit mask has been described, but exemplary embodiments of the present invention are not limited thereto. For example, in an exemplary embodiment, the photosensitive film pattern may be formed by using a halftone mask, a mesh mask, or a slit mask.

Figure 9:
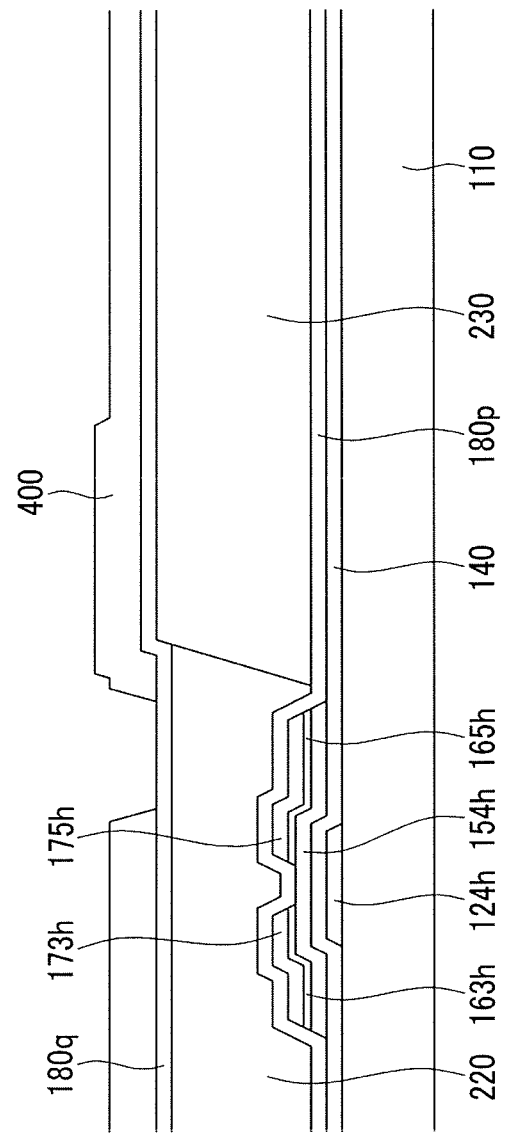

Then, a photosensitive film pattern 400 is formed, and the upper passivation layer 180*q* and the color filter 230 are etched by using it as a mask, as shown in FIG. 9.

In this case, a first contact hole 185*h* is also formed so as to make the first subpixel electrode 191*h* and the first drain electrode 175*h* contact each other.

Figure 10:
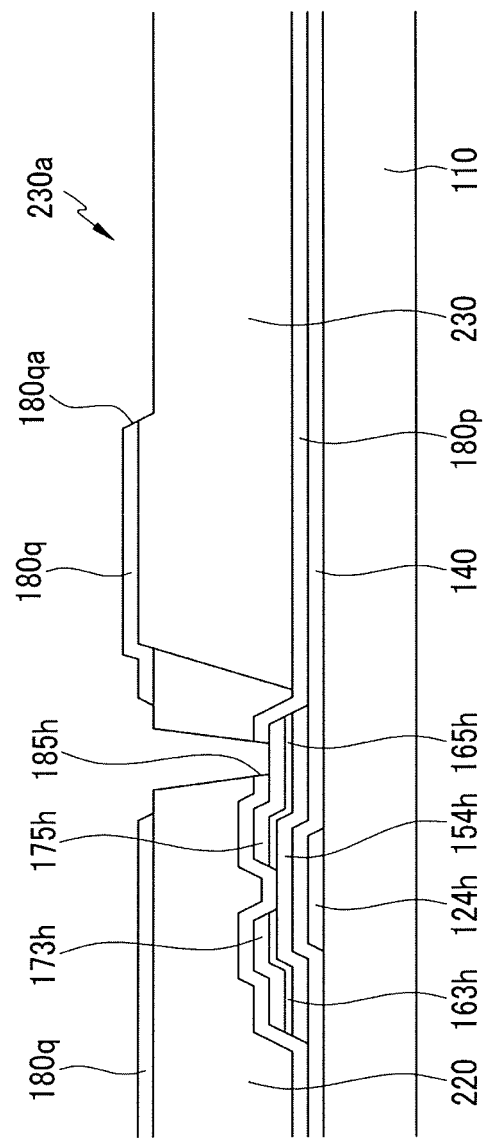

As shown in FIG. 10, after performing the etching process described above, the forming an opening region 180*qa* in the upper passivation layer 180*q* and the forming the contact hole 185*h* exposing the drain electrode 175*h* are, for example, simultaneously performed, and a stepped region 230*a* is formed in the color filter 230.

That is, the current interfacing surface of the upper passivation layer 180*q* and the color filter 230 is removed by, for example, etching.

Thus, the ionic impurities positioned on the interfacing surface are also removed.

For example, the opening region 180*qa* and the stepped region 230*a* are simultaneously formed, and the stepped region 230*a* has a lower height than a height of other color filter regions 230 other than the stepped region 230*a*.

Thus, the color filter 230 positioned in one pixel may be formed to include the stepped region 230*a* having a more or less smaller height, and other regions having more or less greater heights than the stepped region 230*a*.

In this case, the opening region 180*qa* may be formed to have, for example, a height that is greater than about 700 Å.

This is because removal of an interfacing surface of the laminated color filter 230 and upper passivation layer 180*q* may be conventionally required before performing the etching process.

Further, when etched by the etching process described above, the opening region 180*qa* may be formed to have any shape, such as a rhombus or a quadrangle shape as an example. For example, a rhombus-shaped opening region 180*qa* is illustrated in FIG. 1

Next, a pixel electrode 191 is formed on the upper passivation layer 180*q* and 180*qa* to have a structure shown in FIGS. 1 to 3.

That is, a plurality of pixel electrodes 191 are formed on the upper passivation layer 180*q*, and the pixel electrode 191 may directly contact the upper passivation layer 180*q* in the regions other than the opening region 180*qa*, and may directly contact the color filter 230 in the opening region 180*qa*.

The present exemplary embodiment illustrates the pixel electrode 191 including a plurality of cutouts 91*a* and 91*b*, but exemplary embodiments of the present invention are not limited thereto. For example, in an exemplary embodiment, the pixel electrode 191 may have various shapes including a plurality of fine branch portions.

However, the pixel electrode 191 should be formed to cover the opening region 180*qa* on the plane.

This is because inflow of the ionic impurities into the liquid crystal layer 3 through the opening region 180*qa* is suppressed by the pixel electrode 191.

Figure 11:
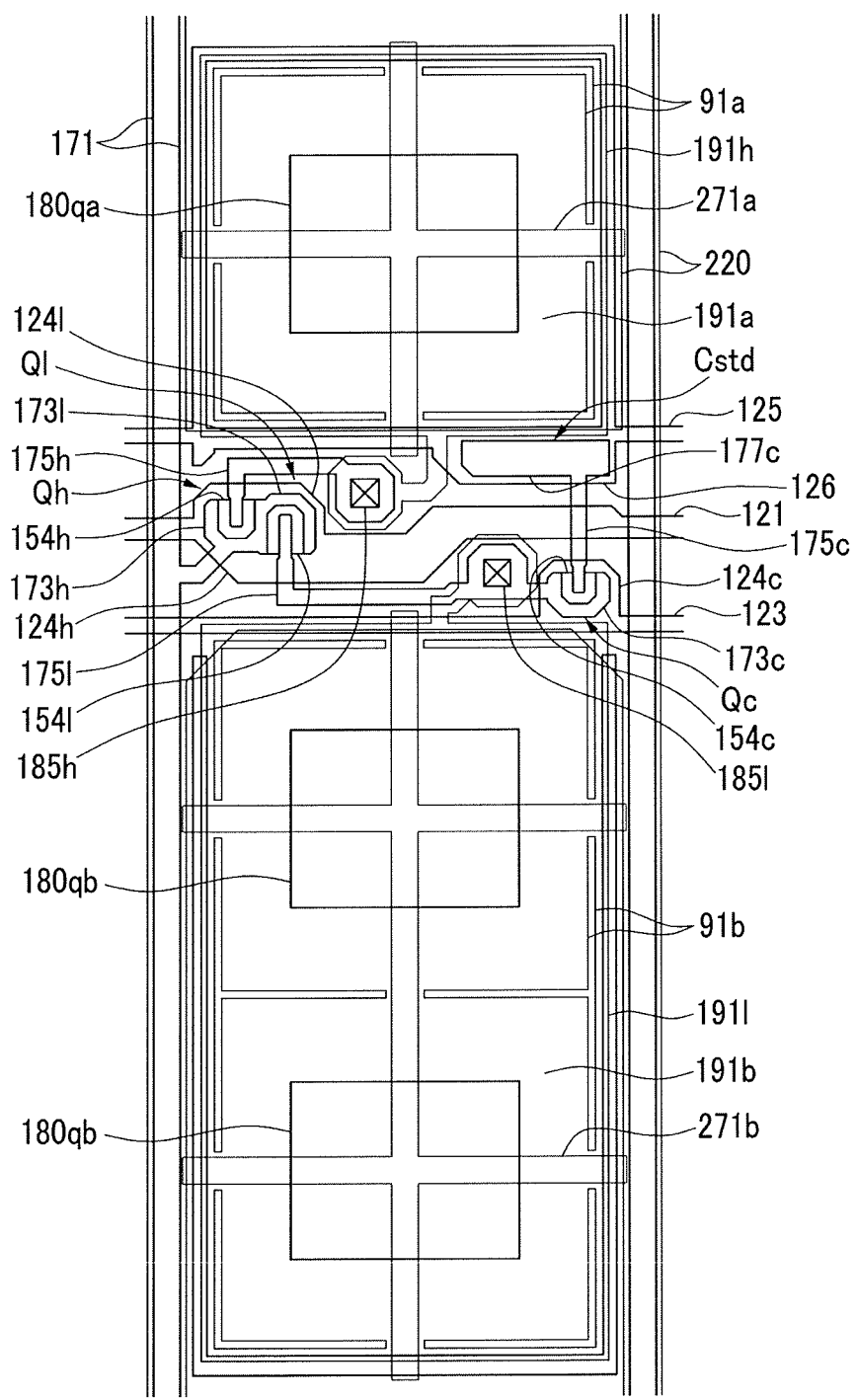
FIG. 11 is a layout view of a pixel of a liquid crystal display device according to an exemplary embodiment of the present invention.

FIG. 11 is a layout view of a pixel of a liquid crystal display device according to an exemplary embodiment of the present invention, and a description of the same configurations as in the present exemplary embodiment described above will be omitted.

FIG. 11 shows a case in which an opening region 180*qa* of the upper passivation layer 180*q* has a quadrangular shape.

Compared with a case of FIG. 1, this case differs from the case of FIG. 1 in that the opening region 180*qa* of the upper passivation layer 180*q* has a rhombus shape.

It can be seen that the shape of the opening region 180*qa* does not influence suppression of the afterimages, and thus the opening region 180*qa* may have various shapes.

However, according to the present exemplary embodiment, the pixel electrode 191 should have a planar shape corresponding to a planar shape of the opening region 180*qa* so as to suppress the inflow of the ionic impurities through the opening region 180*qa*.

That is, the pixel electrode 191 includes a region having a shape corresponding to planar shapes of the opening region 180*qa* and the stepped region 230*a*.

In this case, the opening region 180*qa* and the stepped region 230*a* may have a flat plate shape.

Figure 12:
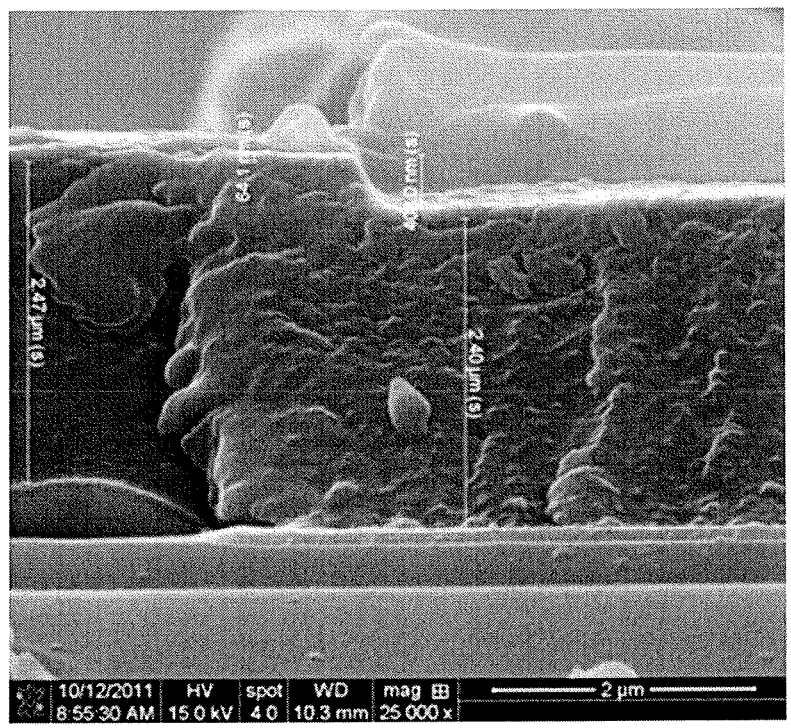
FIG. 12 is a cross-sectional image of a region in which a passivation layer is partially removed according to an exemplary embodiment of the present invention.

FIG. 12 is a cross-sectional image of a region in which a passivation layer is partially removed according to an exemplary embodiment of the present invention.

In this case, it can be seen that the passivation layer 180*q* is not only formed with the opening region 180*qa*, but the stepped region 230*a* is also formed to have the same planar shape.

Such forming removes the interfacing surface of the color filter 230 and the passivation layer 180*q*, thereby removing the ionic impurities positioned on the interfacing surface.

A gray variation according to an exemplary embodiment of the present invention will now be described with reference to FIGS. 13 and 14.

Figure 13:
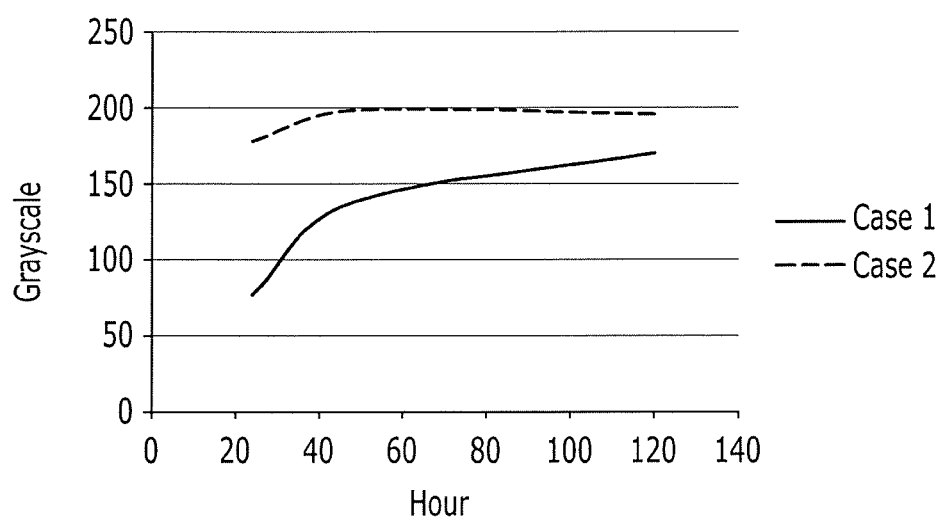
FIGS. 13 to 14 are gray variation graphs of an exemplary embodiment of the present invention and a comparative example.
Figure 14:
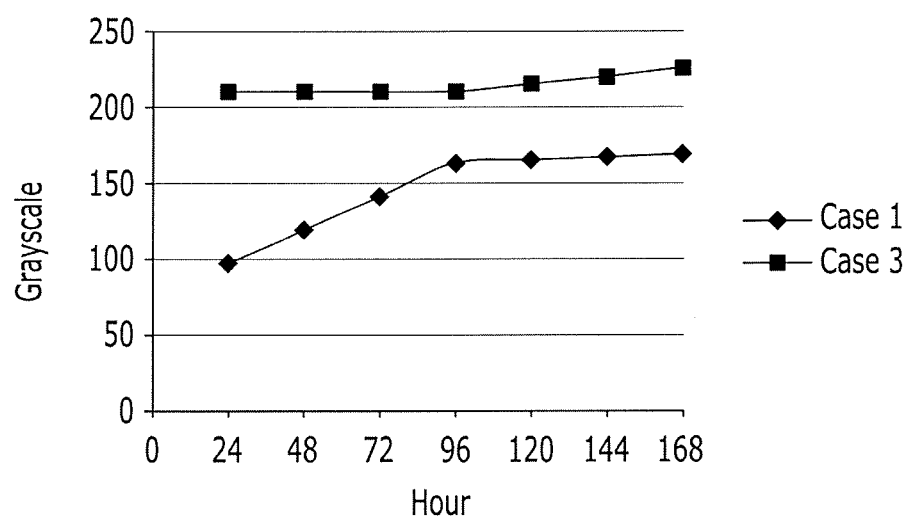

FIGS. 13 to 14 are gray variation graphs of an exemplary embodiment of the present invention and a comparative example.

Referring to FIG. 13, a long term afterimage test is performed to get a graph showing a test result, and the display device according to the present exemplary embodiment is shown as a case 1 while a display device in which the upper passivation layer does not include the opening region is shown as a case 2.

The test result shows that there is a difference of about 100 gray levels between the case 1 and case 2 at the beginning, but as time goes by, the case 1 is increased by about 20 gray levels with respect to the case 2.

Further, referring to FIG. 14, the display device according to the present exemplary embodiment is shown as a case 1 while a display device in which the upper passivation layer does not include an opening region and the pixel electrode includes a shape of a fine branch portion is shown as a case 3.

The test result shows that there is a difference of about 100 gray levels between the case 1 and case 3 at the beginning, but as time goes by, the case 1 is increased by about 50 gray levels with respect to the case 3.

Accordingly, in the display device according to exemplary embodiments of the present invention, the ionic impurities generated in the interfacing surface of the color filter and the passivation layer may be removed or suppressed, thereby reducing the afterimages.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A liquid crystal display device, comprising:
   a first insulation substrate;
   a color filter disposed on the first insulation substrate and including a stepped region;
   a passivation layer disposed on the color filter and including an opening region overlapping the stepped region;
   a pixel electrode disposed on the passivation layer including the opening region;
   a second insulation substrate overlapping the first insulation substrate;
   a liquid crystal layer disposed between the first and second insulation substrates; and
   a common electrode disposed between the second insulation substrate and the liquid crystal layer and including a cross-shaped cutout,
   wherein the color filter is continuous over an entirety of the stepped region overlapping the opening region, and
   wherein a center of the cross-shaped cutout and the opening region overlap each other.

2. The display device of claim 1, wherein the stepped region disposed in the opening region has a greater height than a height of the color filter disposed in regions other than the stepped region.

3. The display device of claim 1, wherein the color filter and the pixel electrode contact each other in the opening region.

4. The display device of claim 1, wherein the pixel electrode includes a plurality of sub-regions based on edges of the pixel electrode and the cross-shaped cutout, and
   the pixel electrode includes cutouts disposed along the edges of the pixel electrode.

5. The display device of claim 1, wherein the opening region has a flat plate shape on a plane.

6. The display device of claim 1, wherein the pixel electrode has a same shape as a planar shape of the opening region.

7. The display device of claim 1, wherein a height of the opening region is greater than about 700 Å.

8. The display device of claim 1, further comprising:
   a first thin film transistor and a second thin film transistor disposed on the first insulation substrate and connected to gate lines and data lines that are insulated from and cross each other, and
   a voltage-dividing thin film transistor connected to the gate lines, the second thin film transistor, and a reference voltage line.

9. The display device of claim 8, wherein the pixel electrode includes:
   a first pixel electrode connected to the first thin film transistor; and
   a second pixel electrode connected to the second thin film transistor and the voltage-dividing thin film transistor, wherein
   the first and second pixel electrodes are disposed in a matrix form so as to form one pixel.

10. The display device of claim 9, wherein liquid crystal molecules of the liquid crystal layer are disposed to be nearly perpendicular to surfaces of the first and second substrates when no electric field is applied to the liquid crystal layer.

* * * * *